Inventor
Joseph E. Drury

Oct. 28, 1952          J. E. DRURY          2,615,532
AIR OPERATED BALL AND ROLLER BEARING GREASE PACKER
Filed April 25, 1949          2 SHEETS—SHEET 2
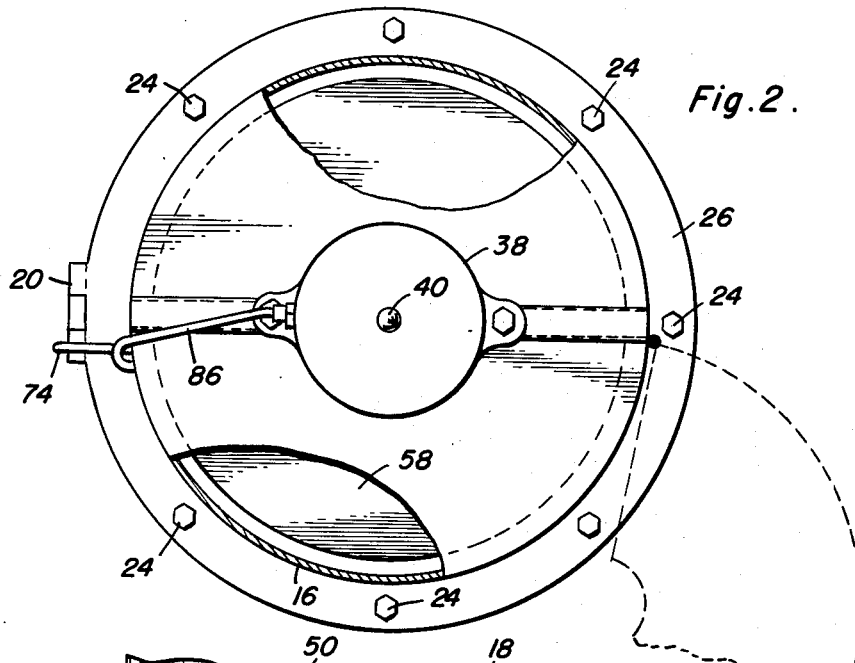
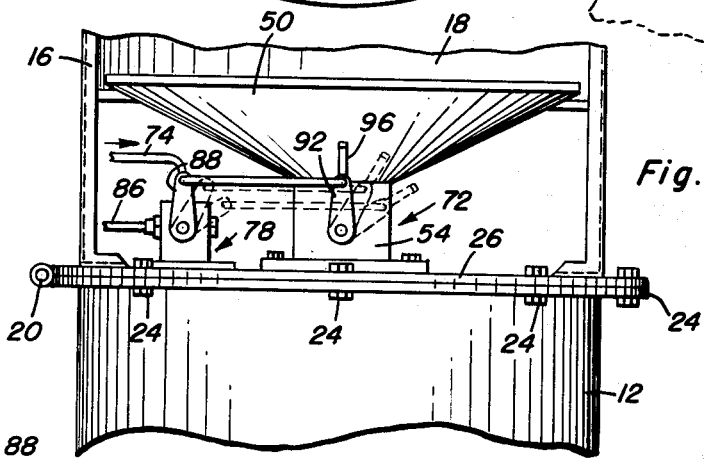
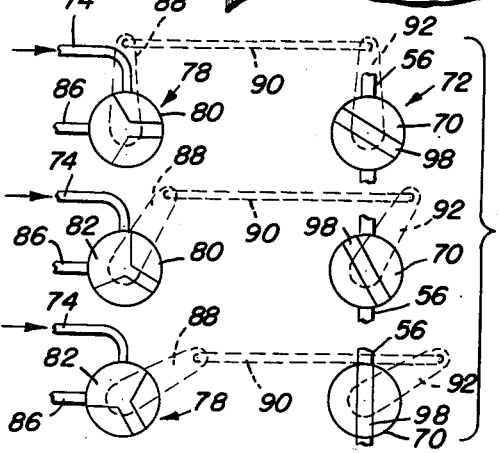
Inventor
Joseph E. Drury Patented Oct. 28, 1952

2,615,532

UNITED STATES PATENT OFFICE 2,615,532

AIR OPERATED BALL AND ROLLER BEARING GREASE PACKER

Joseph E. Drury, Richland, Wash.

Application April 25, 1949, Serial No. 89,388

4 Claims. (Cl. 184—1)

This invention relates to novel and useful improvements in bearing assembly packers or lubricating devices used for the purpose of both forcing dirty grease from a bearing assembly and supplying fresh, new grease in lieu thereof.

An object of this invention is to retain a bearing assembly between holding surfaces of holding elements by means of a fluid such as air or liquid under pressure and by manipulation of a single operator apply grease or lubricant between the holding surfaces and more specifically between the races of the bearing assembly.

Another object of this invention is to retain a roller or ball bearing assembly in a seat by means of a fluid operated holder and to open a valve which interconnects the region of the seat with a grease or lubricant storage supply whereby the lubricant under pressure is forced into the bearing assembly thereby preventing the necessity of hand-packed lubrication operations on bearings and bearing assemblies.

A feature of the invention is the full fluid operated system applying a fluid pressure on the grease or lubricant and a fluid pressure on the holder to retain the bearing assembly in a seat, the application of the fluid pressure to the holder being controlled by a valve which is operable simultaneously with the valve controlling the flow of lubricant from the lubricant chamber into the work chamber having the bearing assembly disposed therein.

Another feature of the invention is the housing which is a unitary structure having a pair of chambers, one being a work chamber and another being a lubricant chamber separated by means of a partition and a valve disposed on said partition, the housing forming a closure for the operative elements so that dust and other foreign objects will be prevented from impinging on the grease and on the operative elements of the device.

Ancillary objects and features will become apparent to those skilled in the art in following the description of the preferred form of the invention, illustrated in the accompanying drawings, wherein:

Figure 2 is a plan view of the apparatus shown in Figure 1, with portions being broken away in section to illustrate detail of construction;

Figure 3 is an elevational view illustrative particularly of the valve coordination in the apparatus, and;

Figure 4 is a series of schematic views showing various coordinated valve settings between the air valve and the lubricant valve.

Figure 1:
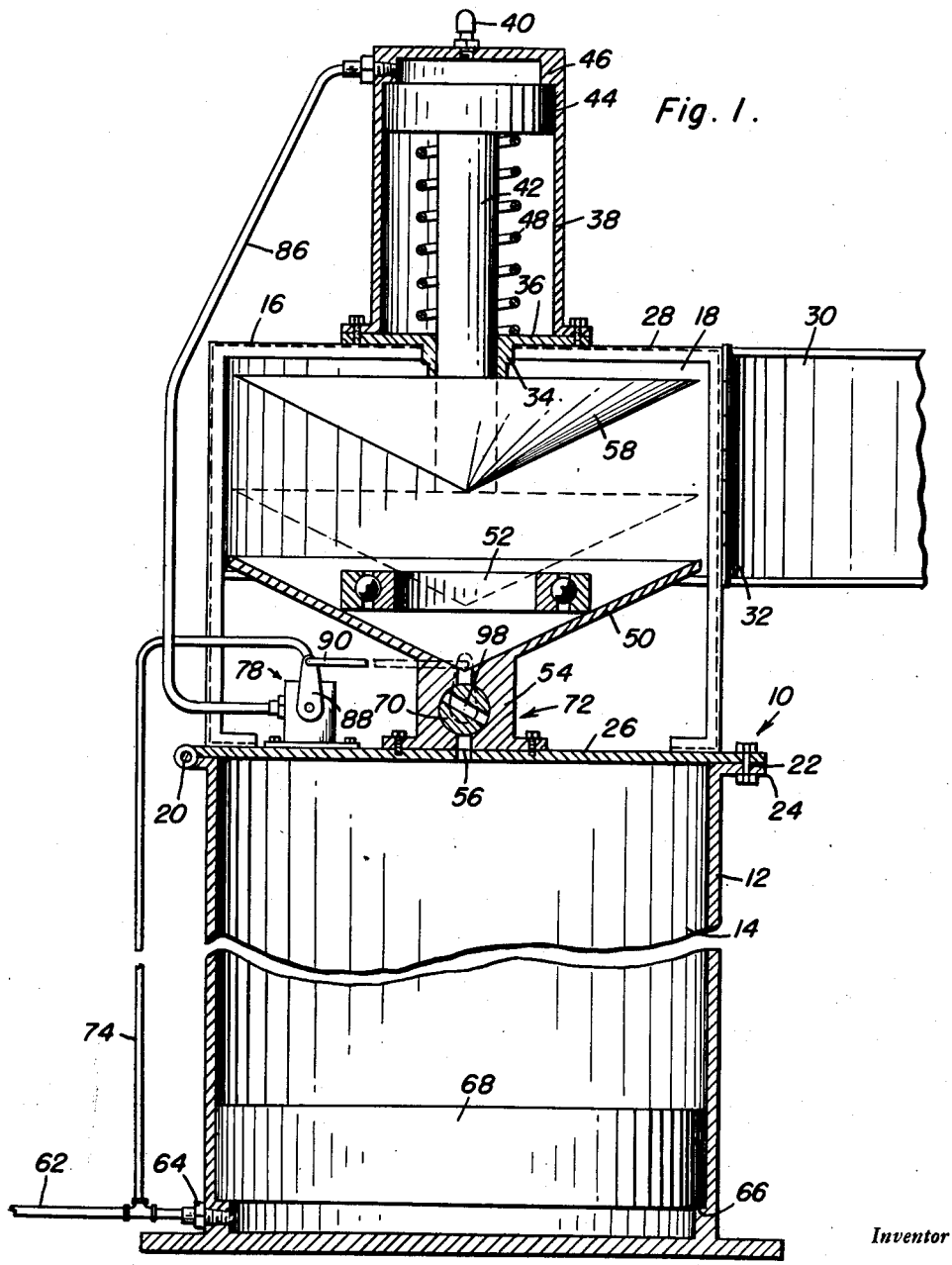
Figure 1 is a longitudinal sectional view of the invention in its preferred form.

The present invention includes certain operative structure so arranged that a conventional bearing assembly may be packed or lubricated through the utility of a source of power which is fluid under pressure. The fluid referred to is preferably air however, hydraulic fluid may be used equally as well as the air pressure. In shops there is generally accommodation for air outlet means having the air under pressure and accordingly the present device is adapted for connection therewith, requiring no other source of power other than the manual for operation of a valve control handle or lever.

The housing is generally indicated at 10 and includes a lower chamber member 12 defining a lower chamber 14 and a work or upper chamber member 16 defining an upper chamber 18. A hinge 20 connects the upper chamber member 16 with the lower chamber member 12 and bolts 22 are passed through the flange 24 of the lower chamber member 12 and through the partition 26 which is fixed with the upper chamber member 16.

The upper chamber member 16 has an opening 28 in the front and top thereof with a closure 30 operable thereover by means of its hinge connection 32 to the upper chamber member 16. A boss 34 passes through an opening in the top of the work chamber member 16 and is fixed to a bottom plate 36 of the cylinder 38. This cylinder is disposed on the top of the work chamber member 16 and has a pressure responsive safety valve 40 therein. A plunger which includes a rod 42 and piston head 44 is disposed for reciprocatory movement in the cylinder 38 and is limited in its upward movement by means of the shoulder or stop 46 formed in the cylinder adjacent the top thereof. A spring 48 reacts on the piston head 44 and the bottom plate 36 opposing the operation of the plunger.

A seat 50 having a conventional bearing assembly 52 engaging surface is disposed in the work chamber. A valve body 54 spaces the bottom of the seat slightly from the partition 26 and has a valve passage 56 extending therethrough. A conical holder 58 is disposed at the end of the plunger rod 42 and the outer lower surface thereof is adapted to engage the conventional bearing assembly and more specifically the inner race thereof. The holder 58 pressing against the inner race of the bearing assembly 52 while the seat 50 has the outer race disposed thereon, retains the bearing assembly in place in the work chamber.

Adapted for connection with a fluid pressure outlet is a pipe 62 which forms an inlet for air under pressure into the apparatus. By means of a fitting 64 the pipe 62 is connected with the lower part of the grease or lubricant chamber 14. A shoulder 66 is disposed in the lower part of the preferably cylindrically shaped chamber member 12 and it has the piston 68 disposed thereon when the grease retaining chamber is full of its supply of lubricant. Upon application of air under pressure into the lower part of the chamber 14, the piston 68 is forced upwardly thereby pressing lubricant against the core 70 of the lubricant valve generally indicated at 72.

At the same time, air under pressure is delivered through the pipe 74 which is communicated with the pipe 62 and the said pipe 74 terminate in an air valve 78. This air valve is capable of three functions as disclosed in Figure 4. In one setting of the core 80 the air under pressure simply strikes the core, the valve being in the off position. However, by movement of the core slightly the air under pressure flows through the passage 82 in the core 80 thereby allowing it to flow through the line or conduit 86. Rotation of the core further to reach the third position or setting of the valve 78 does not effect the valve materially from the previous position. That is, the air under pressure flows through the line 74, then through the passage 82 and ultimately through the line 86.

In Figure 1 it is evident that the line 86 extends from the air valve 78 and terminates in the upper part of the cylinder 38. Accordingly, this applies a pressure on the piston head 44, forcing the holder 58 downwardly toward the bearing assembly 52. But this operation is opposed by the spring 48 whereby upon relieving the air under pressure from the cylinder 38, the spring 48 will return the holder 58. If an unsafe pressure is developed in the cylinder 38, the safety valve 40 becomes activated thereby relieving at least a part of the pressure.

The lubricant valve 72 is interconnected for operation with the valve 78. To operate the core 80 of the valve 78, an arm 88 is fixed thereto. A link or pitman 90 is secured at one end to the operating arm 88 and secured at its opposite end to another operating arm 92 which is fixed to the core 70 of the lubricant valve 72.

In operation the operator or handle 96 which is fixed to the arm 92 is first considered at rest. The air under pressure is stopped by means of the core 80 as disclosed in the first illustration of Figure 4. At this time the lubricant valve is also closed. Bearings may be placed in the work chamber with the valves in this setting.

Then, the handle 96 is moved to the second position as disclosed in the second part of Figure 4. Accordingly, the valve 78 opens thereby forcing the holder 58 downwardly against the bearing 52 disposed on the seat 50. The bearing is centered by the action of the seat and holder. Upon further movement of the handle 96 to the position as shown finally in Figure 4, for practical purposes the valve 78 is unaffected but due to the action of the interconnecting link 90, the core 70 of the valve 72 opens the passage 56 by aligning the passage 98 in the core 70 therewith. Grease or other type of lubricant then flows through the valve 72 and into the bearing assembly 52 under pressure. After a short duration the valve control 96 is moved to the initial position thereby relieving the pressure in the cylinder 38 and closing the valve 72. Accordingly, the apparatus is then in such condition whereby the closure 30 may be opened and the bearing assembly 52 removed. Another bearing assembly may be placed directly therein for a similar operation.

Having described the invention, what is claimed as new is:

1. In a bearing assembly lubricating device, a housing having a lubricant chamber member, a bearing assembly seat carried by said housing, a lubricant valve communicating said chamber with said seat, a bearing assembly holder operable in said housing and juxtaposed with respect to said seat, means operatively connected with said holder for urging said holder against a bearing assembly disposed in said seat including an air valve, an air pressure inlet line attached thereto, means secured to said lubricant valve and said air valve connecting said valves for simultaneous operation, a piston disposed in said lubricant chamber member, said inlet line being operatively connected with said chamber member to urge said piston to force lubricant through said lubricant valve, and an air line extending from said air valve and operatively connected with said holder.

2. In a bearing assembly packing device, a lubricant supply chamber, a bearing assembly seat and a bearing assembly holder, means supporting said seat and means supporting said holder for reciprocatory movement in juxtaposition to said seat, means adapted for connection with a single source of fluid pressure for controllably simultaneously applying pressure within said chamber to force lubricant between said seat and said holder and for applying pressure to said holder to operate said holder toward said seat and including a lubricant valve disposed between said seat and said chamber, a pressure valve, means connecting said valves for simultaneous operation, and conductors secured to said pressure valve and operatively connected respectively with said chamber and said holder.

3. In a bearing assembly packing device, a lubricant supply chamber, a bearing assembly seat and a bearing assembly holder, means supporting said seat and means supporting said holder for reciprocatory movement in juxtaposition to said seat, means adapted for connection with a single source of fluid pressure for controllably simultaneously applying pressure within said chamber to force lubricant between said seat and said holder and for applying pressure to said holder to operate said holder toward said seat and including a lubricant valve disposed between said seat and said chamber, a pressure valve, means connecting said valves for simultaneous operation, conductors secured to said pressure valve and operatively connected respectively with said chamber and said holder, and resilient means reacting on said holder opposing the pressure operation thereof.

4. A bearing assembly lubricating apparatus comprising a housing having a lubricant chamber and a work chamber, a partition disposed in said housing separating said chambers, a seat mounted in said work chamber and carried by said partition, a lubricant valve interposed between said seat and said lubricant chamber, a cylinder forming a plunger chamber and secured to said housing, a plunger reciprocatively disposed in said plunger chamber and having a holder head disposed adjacent said seat in said work chamber, means reacting on said plunger and said housing opposing the operation of said plunger, and a pressure valve adapted for connection with a source of air under pressure, a conduit extending from said pressure valve and secured for communication with said plunger chamber to introduce air under pressure from said pressure valve to said plunger chamber to operate said plunger, and means connecting said valves for sequential actuation for initially operating said plunger to hold a bearing in said seat and then for opening said lubricant valve.

JOSEPH E. DRURY.

REFERENCES CITED

The following references are of record in the file of this patent:

UNITED STATES PATENTS

| Number | Name | Date |
|---|---|---|
| 1,766,208 | Anstiss | June 24, 1930 |
| 1,878,277 | Hodge | Sept. 20, 1932 |
| 2,168,746 | Saal | Aug. 8, 1939 |
| 2,209,495 | Scholfield | July 30, 1940 |
| 2,270,754 | Ginter | Jan. 20, 1942 |

FOREIGN PATENTS

| Number | Country | Date |
|---|---|---|
| 906,794 | France | May 28, 1945 |